United States Patent [19]

Low et al.

[11] 3,996,425
[45] Dec. 7, 1976

[54] CALL DENIAL CIRCUIT

[75] Inventors: Arnold Edward Low, San Mateo;
Michael John Sturtevant, Berkeley,
both of Calif.

[73] Assignee: **Bell Telephone Laboratories,
Incorporated**, Murray Hill, N.J.

[22] Filed: Oct. 23, 1975

[21] Appl. No.: 625,321

[52] U.S. Cl. .......................................... 179/18 DA
[51] Int. Cl.² .......................................... H04M 1/66
[58] Field of Search ................................. 179/18 DA

[56] References Cited
UNITED STATES PATENTS 3,821,485   6/1974   Harrington et al. .......... 179/18 DA

*Primary Examiner*—William C. Cooper
*Attorney, Agent, or Firm*—David H. Tannenbaum

[57] ABSTRACT

A cail denial circuit is disclosed for restricting selected calls outgoing from a PBX or key telephone system. The circuit is arranged to handle both dial pulse signaling and multifrequency tone signaling from the same station while at the same time being arranged to prevent a mixture of the two types of signaling on the same call. One dial pulse detector is utilized for each line in conjunction with a multifrequency tone detector shared by all of the lines. A continuously operating scanner sequentially causes the registered digits, both from the individual dial pulse detectors and from the common tone detector, to be supplied to a common check circuit on a time-shared basis.

17 Claims, 13 Drawing Figures

CALL DENIAL CIRCUIT (KTS)

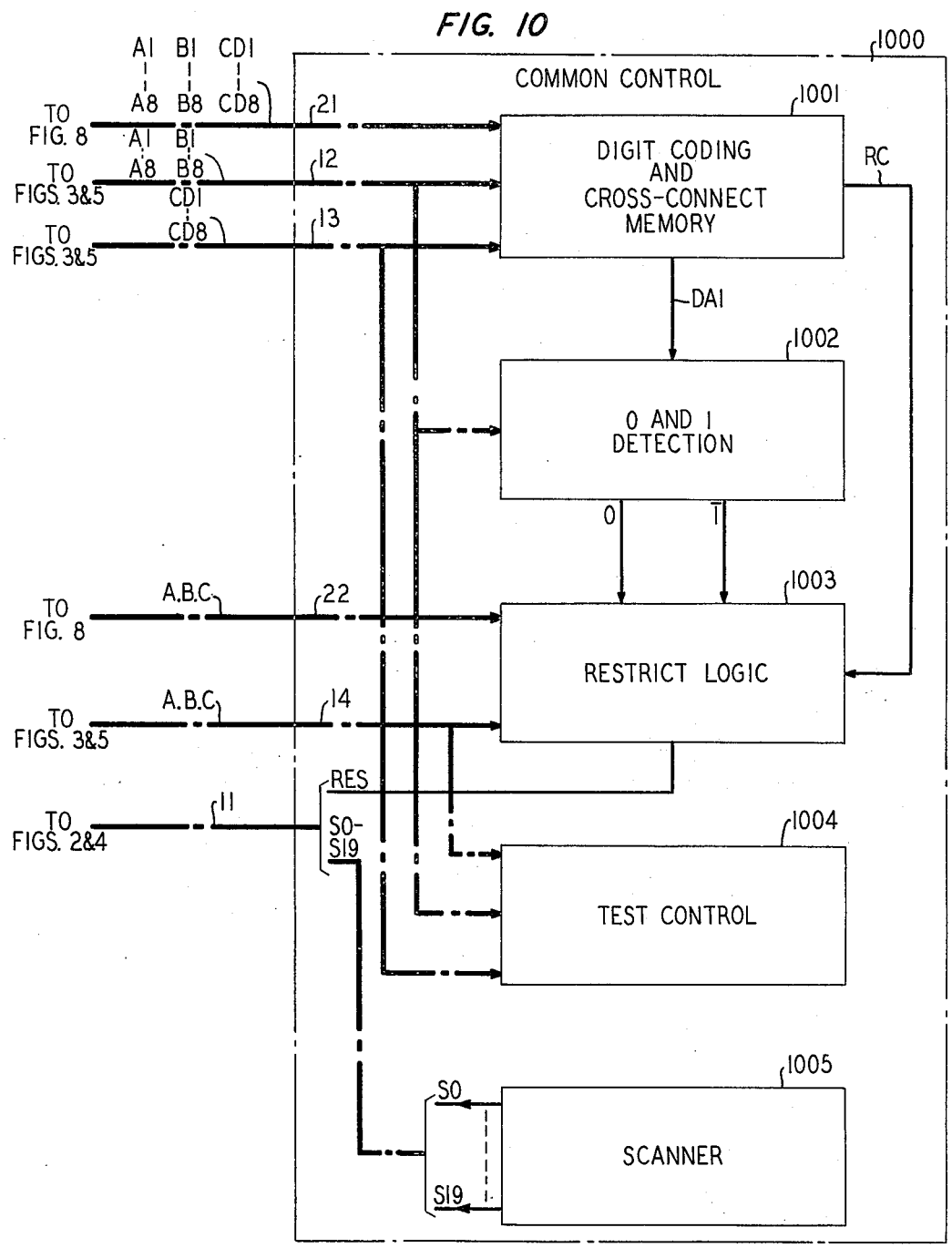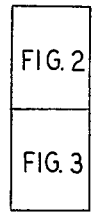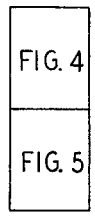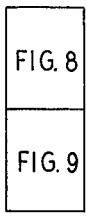

CALL DENIAL CIRCUIT

BACKGROUND OF THE INVENTION

This invention relates to call restriction arrangements for telephone communication systems and, in particular, to an improved common control circuit arrangement for screening both rotary and multifrequency calling digits.

Some call screening arrangements utilize a combined register-check circuit associated with an outgoing line on every call. The circuit continuously monitors the line, records each dialed digit, detects invalid dial codes, and effects the release of the calling connection if the dialed digits represent a restricted code. Inasmuch as these circuits remain connected to the line during dialing, long holding times are experienced, particularly on the subscriber-originated calls from a private branch exchange (PBX). In order to insure that sufficient numbers of these circuits are available to screen every call from a busy PBX, it is oftentimes necessary to provide almost one such circuit for every trunk.

As a solution to the above problem, a system has been developed in which each telephone line is equipped with a dial pulse register for storing the first three dialed digits. A common check circuit is then used to scan the digits registered with each line and when an invalid code is recorded in any register the common check circuit operates to restrict the call associated with that line. Such an arrangement is described in U.S. Pat. No. 3,821,485 issued to R. J. Harrington, A. E. Low and M. J. Sturtevant on June 28, 1974.

Although the above-mentioned Harrington et al patent is an advance in the art, one problem remains, namely, that the system operates only on rotary dialed digits and is not suited for use with multifrequency-dialed calls. This result follows from the fact that although it is a relatively easy operation to decode sequential rotary-dialed digits which are basically a stream of electrical pulses, it is a much more complicated matter to decode and translate electrical signal frequencies into dialed digit equivalents. Thus, the decoding and translating equipment which would be necessary on a per line basis if the Harrington et al. teaching were to be used with multifrequency dialing becomes prohibitively expensive.

Compounding the problem further is the fact that any line can be used for both rotary-dialed calls and for multifrequency-dialed calls, thereby requiring both a dial pulse register and a multifrequency pulse receiver to be associated with each line. Further compounding the problem is the fact that central office common control equipment can be arranged to process a call which is partially rotary dialed and partially multifrequency dialed.

Accordingly, a need exists in the art for a toll restrictor circuit capable of handling both rotary-dialed and multifrequency-dialed calls as well as being able to respond to calls partially dialed with either dialing scheme.

SUMMARY OF THE INVENTION

The foregoing needs of the prior art are solved in an illustrative embodiment of our invention in which a common check circuit periodically screens, in sequential order, a plurality of call denial rotary-dialed digit registers which are individually associated with particular lines to record calling data. The connection of each digit register to the common check circuit is accomplished under control of a free running scanner which is operated at a rate such that the recorded contents of each digit register is screened, or checked, after each dialed digit is stored therein. During the interval that the common check circuit is checking the contents of a particular register, the stored data is gated into the check circuit. If the data corresponds to the identity of a restricted call address, a restrict signal is generated that eventually causes the call associated with the connected one of the digit registers to be terminated.

For multifrequency dial code control at least one multifrequency register circuit is arranged common to all of the lines. When the active status of a line is determined the restrict circuit associated with that line operates to bid for an idle multifrequency register via a link circuit. Advantageously, two such register circuits should serve twenty lines without excessive waiting time for an idle circuit. Once the multifrequency register is associated with a line, a link circuit serves to establish a transmission connection from the calling line to the register circuit so that calling digits transmitted from the calling station to the central office are also received and translated by the call restricter register. The output of the register is provided to a common check circuit during the scan cycle of the associated line so that for all practical purposes, for the duration of the first three dialed digits, the common register is uniquely associated and in parallel with the line rotary dial pulse register.

In order to prevent unauthorized calls, the system is arranged to restrict any call where both rotary dialing and multifrequency dialing occur. This is accomplished by recognizing that the common check circuit operates to restrict the call if the first digit is a zero. Under such a condition, both the rotary dial pulse register and the common multifrequency tone register operate to send out a pre-zero during the time in which the first digit is being received. This pre-zero only occurs at the output of the respective registers at a time after the first digit begins to be received and terminates at the time when the entire first digit is received. Since the pre-zero occurs at a time before the entire first digit has been received, this pre-zero has no effect on the common check circuit. However, if an entire digit has been received by one of the registers (for example, the multifrequency register) and a digit is then received by the other (dial pulse) register, the pre-zero will occur at a time when the full first digit is already in the multifrequency register. In this situation the common check circuit acts to restrict the call.

BRIEF DESCRIPTION OF THE DRAWING

The foregoing objects, features and advantages, as well as others of our invention will be more apparent from the drawing, in which:

FIGS. 2 through 10 show our call denial system in more detail; and

FIGS. 11, 12 and 13 show how FIGS. 2 through 10 should be arranged.

GENERAL DESCRIPTION

Figure 1:
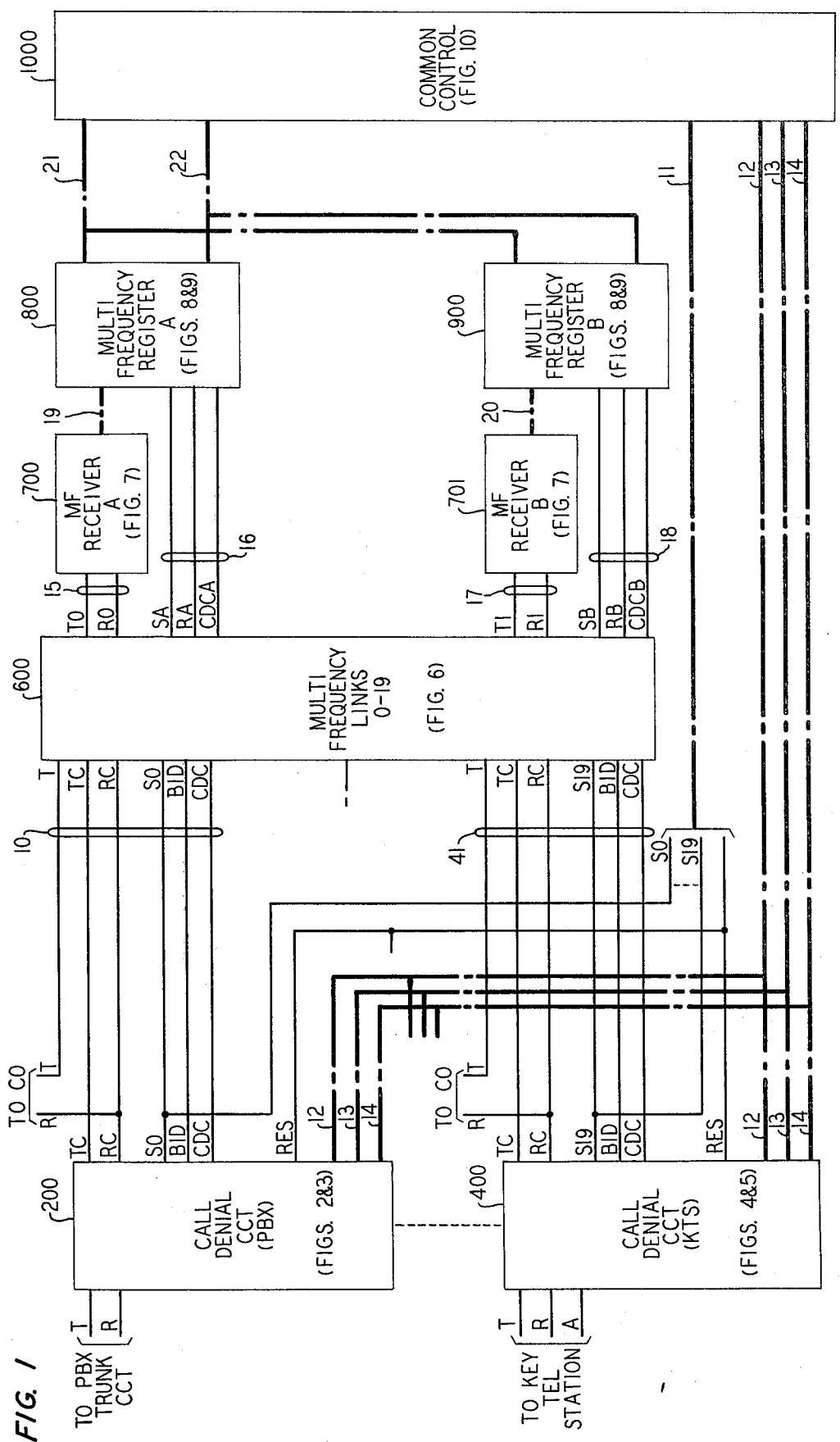
FIG. 1 is a block diagram of our cal denial system utilizing a dial pulse register associated with each line and at least one multifrequency register shared by all the lines.

Referring now to FIG. 1, there is shown a call denial circuit 200 which is arranged to serve a PBX trunk circuit and a call denial circuit 400 which is arranged to serve a key telephone station (KTS). Although only two such circuits have been shown, it is of course understood that many circuits would be utilized, each serving a particular PBX trunk or key telephone station.

Each call denial circuit has contained therein a dial pulse register for recording the first three dialed digits and, under control of a scanner in common control 1000, these digits are sequentially transmitted to the common control circuit to determine if the digits match the prerecorded valid code digits stored therein. In the event of a mismatch, the T and R leads are reversed (PBX) or switched to tone (KTS) and the call is denied. When a trunk becomes active multifrequency link 600 operates to connect the active call denial circuit with an idle multifrequency register, such as multifrequency register 800 or multifrequency register 900, via either of MF Receiver A (700) of MF Receiver B (701). As will be discussed in further detail hereinafter, any call denial circuit may be connected to any idle multifrequency register and as many such multifrequency registers may be provided as is necessary to handle the anticipated traffic. Once a multifrequency register is associated with a particular call denial circuit, that register remains with the circuit until either a valid or invalid determination is made. As will be discussed hereinafter the scanner in common conrol 1000 operates to sequentially monitor the dialed digits from each of the call denial circuits. The scanner also operates to monitor the multifrequency register in the time slot associated with the call denial circuit currently connected thereto. This is accomplished by assigning a single time slot (scan pulse) to each call denial circuit. For a 20 circuit system 20 scan pulses (0–19), each 5 ms apart and 100 μs in duration, are used in a manner such that scan pulse 0 (shown as S0 of cable 11) goes to the first call denial circuit 200 while scan pulse 19 (S19) goes to the 20th call denial circuit 400.

DETAILED DESCRIPTION

Figure 2:
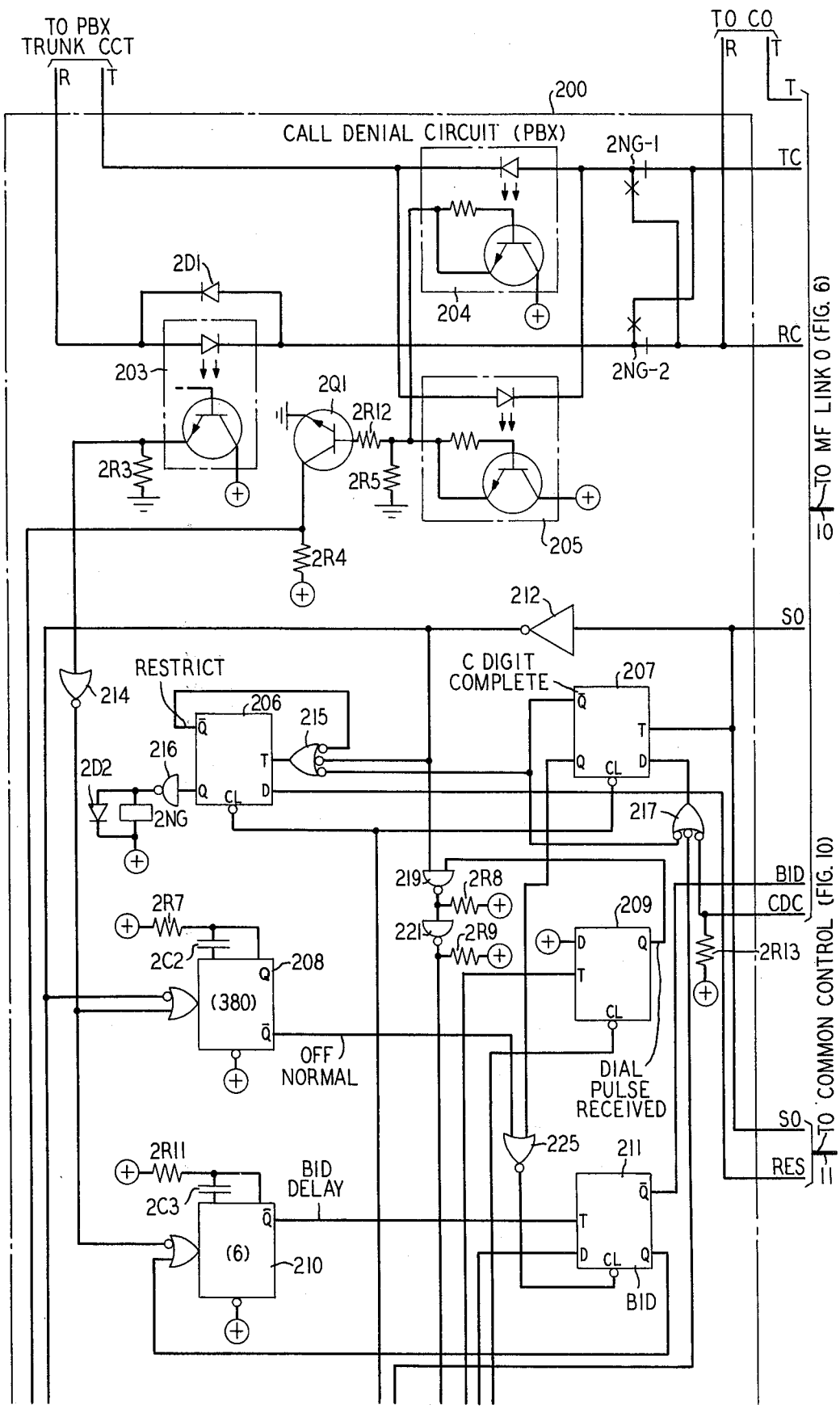

Before beginning the detailed description it may be well to review the operation of certain circuit elements shown in the Figures. For example, the circuit element shown as element 208 in FIG. 2 is a one-shot multivibrator of a well known type such as TTL 9602 where, if the input shown with a small ball is high (positive potential) and the other input is low (ground or negative potential), then either input changing causes the output to change. The output remains in its changed state for a period of time detemined by the associated registor-capacitor network and then returns to its quiescent state where the Q output is low and the $\overline{Q}$ output is high. All of the one-shot circuit elements utilized in the embodiment of this invention are of the retriggerable type where the timing period restarts after the proper input transition. The time in which any one-shot circuit element is active is shown in parentheses within the circuit element box. For example, one-shot 208 is active for approximately 380 milliseconds as controlled by the combination of resistor 2RS and capacitor 2C2, while one-shot 210 is active for approximately six milliseconds under control of its associated resistor-capacitor network. The value of the associated resistor and capacitor to give a particular active time is shown in manufacturer's data sheets.

The circuit element shown as 209 in FIG. 2 is a memory flip-flop of a well-known type such as TTL 7474 where when the T input makes a transition from low to high the Q output switches to the same state as the state of the D input.

As discussed previously, all of the call denial circuits share a common control circuit 1000 shown in FIG. 10, which common control circuit becomes associated with each call denial circuit once every 100 milliseconds for a time period of approximately 100 microseconds, with approximately five milliseconds between each association. This time slot control is provided by scanner 1005, FIG. 10, which scanner operates in a well-known manner to provide 100 microsecond pulses, spaced sequentially every five milliseconds on leads S0 to S19. Lead S0 is associated with a first one of the call denial circuits (in our embodiment call denial circuit 200) and lead S19 is associated with the 20th call denial circuit (in our embodiment call denial circuit 400). These, of course, are arbitrary assignments with the only requirement being that each call denial circuit is associated with a particular one of the scan pulses S0 to S19. Each call denial circuit is associated with a particular one of the multifreqency (MF) links 0 to 19 shown in FIG. 6, with each link having a capability of connecting the associated call denial circuit with an idle one of multifrequency receiver A or multifrequency receiver B. For example, call denial circuit 200 is associated with multifrequency link 0, while call denial circuit 400 is associated with multifrequency link 19. Links 0 to 19 serve the function of connecting an active call denial circuit to an idle multifrequency receiver for the purpose of recording the first three multifrequency-dialed digits.

Dial-pulsed digits, as opposed to MF-dialed digits, are recorded on an individual basis with digit recorders individually associated with each call denial circuit. Thus, for example, dial pulse counter 306 counts the dial pulses associated with call denial circuit 200, while dial pulse counter 506 counts the dial pulses associated with call denial circuit 400.

In our embodiment, call denial circuit 200 is arranged for operation with a PBX trunk circuit and is interposed between the PBX trunk circuit and the central office, while call denial circuit 400 is arranged for operation with a key telephone system and is arranged for connection between the key telephone station and the central office.

Seizure of Idle Multifrequency Receiver

Turning now to FIG. 2, when a calling trunk becomes active, ground is placed on lead R which ground is extended through detector 203, released break contact 2NG-2 and over the R lead to the central office causing current to flow through detector 203 thereby placing a high signal on the input of gate 214. A high on the input of gate 214 causes the output of that gate to go low, thereby placing a low on the ball input to one-shot 210. Assuming at this point that flip-flop 211 is in its quiescent state, the Q output is low which low is provided to the other input of one-shot 210. Accordingly, when the ball input goes low under control of gate 214, one-shot 210 triggers for a 6 milliseconds timed interval. During this interval the $\overline{Q}$ output of one-shot 210 makes a transition from high to low. This transition has no effect on flip-flop 211 at this time.

When ground is detected on lead R and the output of gate 214 goes low, this low is communicated to the nonball input of one-shot 208 which prepares that element to trigger under control of the scan pulse which is received on lead S0. Thus, when the scan pulse goes low on lead S0, the output of gate 212 goes high. When the scan pulse again goes high, the output of gate 212 goes low, triggering one-shot 208. Since the time delay of one-shot 208 is 380 milliseconds and since scan pulse S0 repeats once every 100 milliseconds, one-shot 208 remains in its active condition so long as current continues to flow through the R lead. The $\overline{Q}$ output of one-shot 208 goes low preparing gate 225 to perform the OR function such that when either one-shot 208 returns to its inactive condition or when the third digit is complete as detemined by the triggering of flip-flop 207, flip-flop 211 will be cleared. Since flip-flop 211, as will be seen, is the flip-flop which controls the bidding for an idle receiver, clearing that flip-flop removes the bid control.

Figure 3:
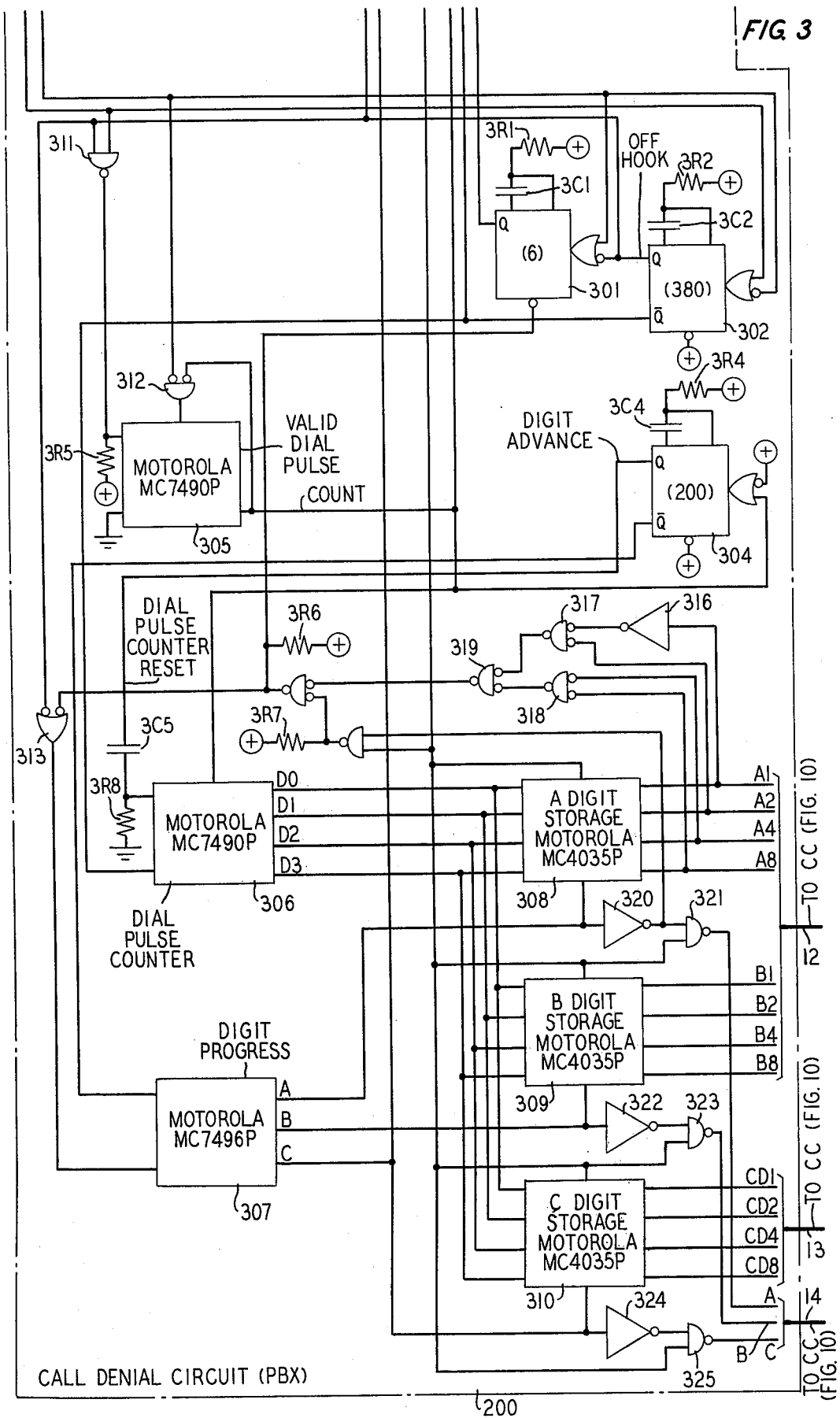
Figure 6:
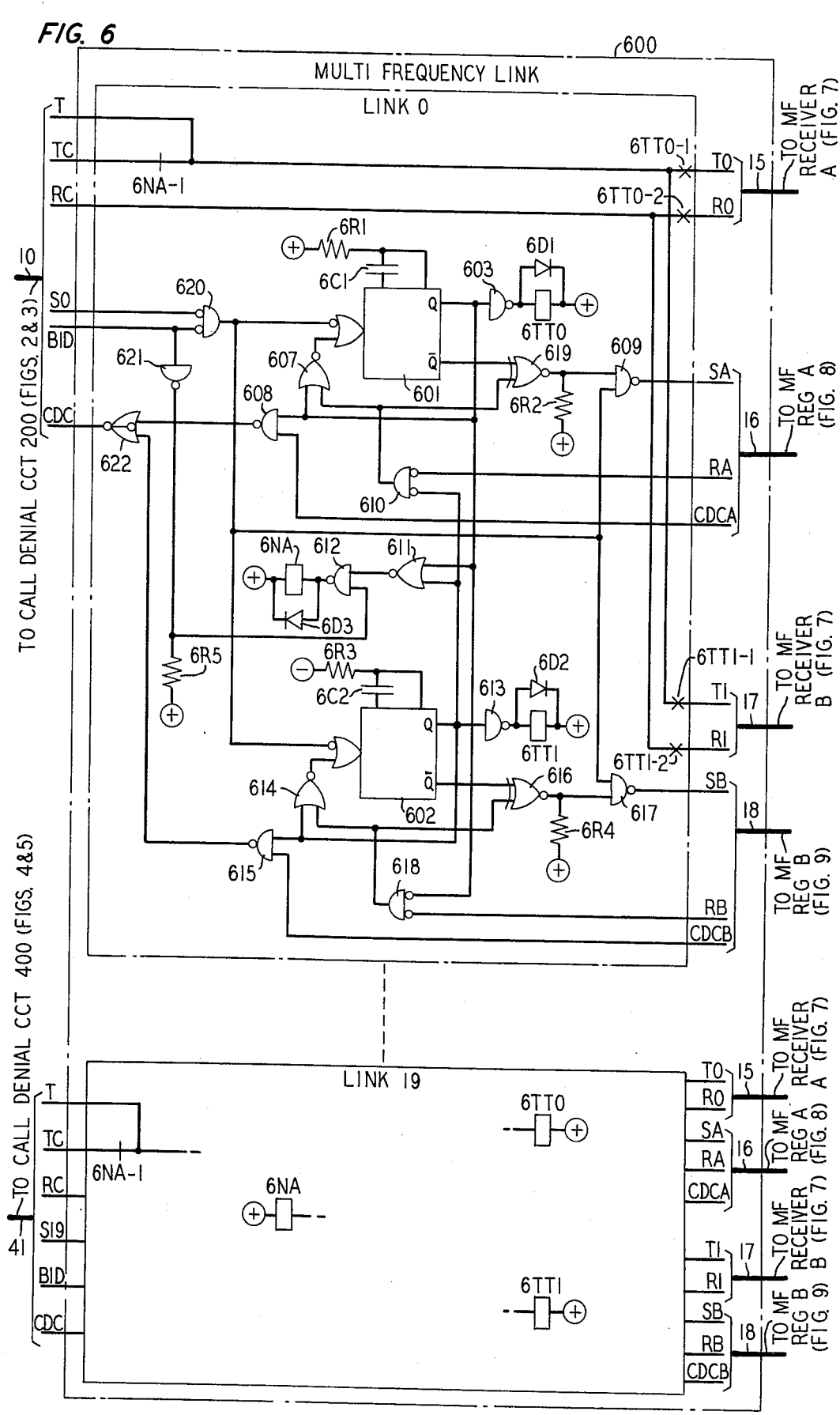

Returning now to one-shot 210, at the completion of its timed interval the $\overline{Q}$ output makes a transition from low to high, thereby triggering flip-flop 211. Since one-shot 302 shown in FIG. 3 is in its inactive condition, its $\overline{Q}$ output is high, which high is presently on the D input of flip flop 211. Thus, upon the triggering of flip-flop 211 its Q output goes high, which high prevents one-shot 210 from being retriggered. The $\overline{Q}$ output of flip-flop 211 goes low, which low is communicated over the BID lead and cable 10 to the associated multifrequency link circuit, which in this case is link 0 shown in FIG. 6. As shown in FIG. 6, the low on lead BID is communicated to one input of AND gate 620. When the scan lead, lead S0 of the associated call denial circuit goes low, the output of gate 620 goes high.

Assuming that both multifrequency receivers A and B are idle, lead RA of cable 16 (receiver A) is low and lead RB of cable 18 (receiver B) is high. These conditions are controlled by gate 914 (FIG. 9) in each register under control of the associated one-shot 902. Thus one input of gate 610 (FIG. 6) has a low thereon and the corresponding input of gate 618 has a high thereon. Since one-shot 602 is presumed to be idle, the low from the Q output is provided to the other input of gate 610. Since both inputs to gate 610 now have lows, the output becomes high which high on the input of gate 607 causes the output to go low, which in turn allows one-shot 601 to become triggered from any high-to-low transition of its ball input. This transition will occur at the conclusion of the scan pulse S0, thereby triggering one-shot 601 and causing its Q output to go high, turning on relay 6TT0. The high on the Q output of one-shot 601 is provided to one input of gate 607 thereby keeping the output of that gate low, which in turn insures that one-shot 601 is retriggered every 100 milliseconds under control of scan pulse S0 as long as the low on the BID lead continues to be present.

Digressing momentarily, it will be seen that the output of gate 620 which controls the bidding for an idle receiver is also connected to one-shot 602. In the situation where both receivers A and B are idle, lead RB, as discussed above would provide a high to the input of gate 618 causing the output to be low which in turn causes the output of gate 614 to be high thereby preventing one-shot 602 from triggering. In the situation where receiver A is busy and receiver B is idle the output of gate 610 is held low and the output of gate 618 goes high. Accordingly, one-shot 602 operates causing relay 6TT1 to operate which in turn connects the TC and RC leads from the call denial circuit to leads T1 and R1 and to receiver B. Of course, any number of receivers can be used depending upon anticipated demand for their usage.

It also should be noted that when ground appears on lead BID (FIG. 6) the output of gate 621 goes high thereby making one input of gate 612 high. Since both one-shot 601 and one-shot 602 must be idle prior to becoming connected to a receiver, both inputs to gate 611 are low and thus the other input to gate 612 is high. Accordingly, upon the application of a low to lead BID, both inputs to gate 612 go high which in turn provides a low for the operation of relay 6 NA. However, relay 6NA has an operate time of approximately two milliseconds, which is slow compared to the operate time of one-shots 601 or 602. Thus, if either of the circuit elements 601 or 602 operate within two milliseconds, which they should if receiver A or receiver B is available, then the high on either Q output causes the output of gate 611 to go low causing the output of gate 612 to go high, thereby removing the operating potential from relay 6NA. The importance of this operation is that if relay 6NA operates, which operation is an indication that no multifrequency receiver is available, current flow from the central office over the T lead, which is extended from FIG. 2, cable 10, is interrupted via enabled break contact 6NA-1. Thus current does not flow over lead TC and cable 10 to FIG. 2 and current detectors 204 and 205 remain off, and the central office does not become connected. While relay 6NA is relatively slow to operate as compared to one-shot elements 601 and 602, that relay is a fast-operate relay with respect to the ground return time of approximately 200 milliseconds from the central office. Thus, while a momentary path exists upon the seizure of the central office that path will be opened before dial tone is received from the central office in the situation where there are no multifrequency receivers available. Under the situation where a receiver is not available, dial tone is not returned to the calling subscriber and the line remains "dead". When a register becomes available dial tone is provided and the digits representative of the called number are dialed.

Figure 7:
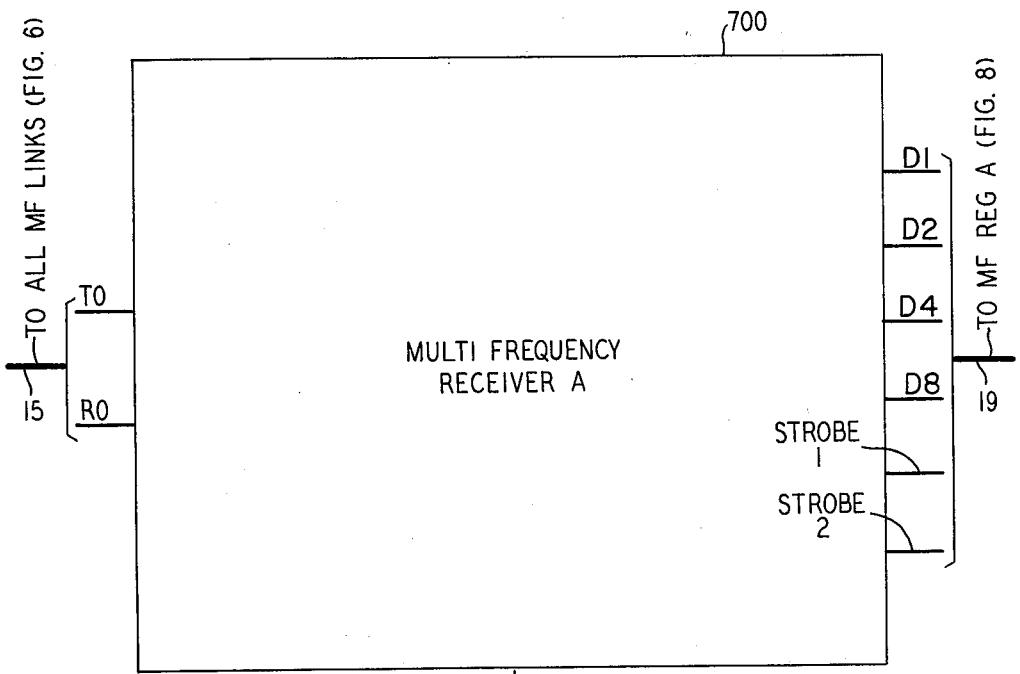
Figure 7:
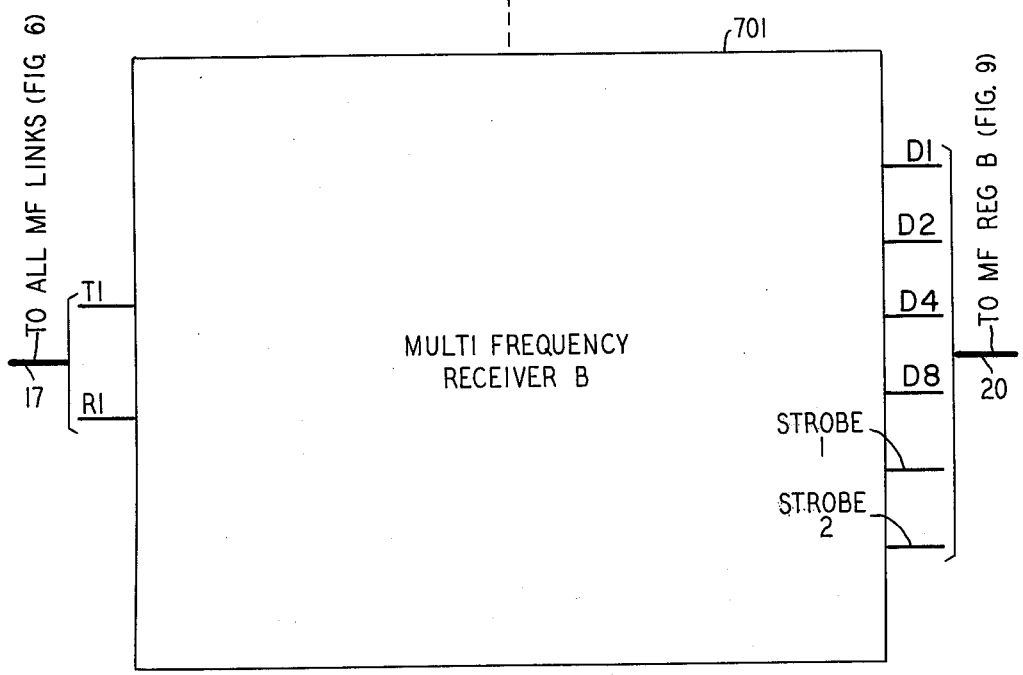

Returning now to FIG. 6, upon the enabling of relay 6TT0 a circuit is closed from lead TC via released break contact 6NA-1 via enabled make contact 6TT0-1 and lead T0 and cable 15 to FIG. 7 multifrequency receiver A. Also the R0 lead from multifrequency receiver A is connected via cable 15 and enabled make contact 6TT0-2 to lead RC. The TC and RC leads are extended via cable 10 to FIG. 2 and via call denial circuit 200, released break contacts 2NG-1 and 2NG-2 through current detectors 204 and 205 to the R and T leads of the PBX trunk circuit. Since a connection to a MF receiver has occurred relay 6NA does not operate and a connection exists from the PBX trunk circuit through call denial circuit 200 and over the R and T leads to the central office. Thus at this time multifrequency receiver A is in parallel with the T and R leads to the central office and any digits dialed by the calling subscriber are also recorded in the attached multifrequency receiver.

MF Digit Timing Control

Figure 9:
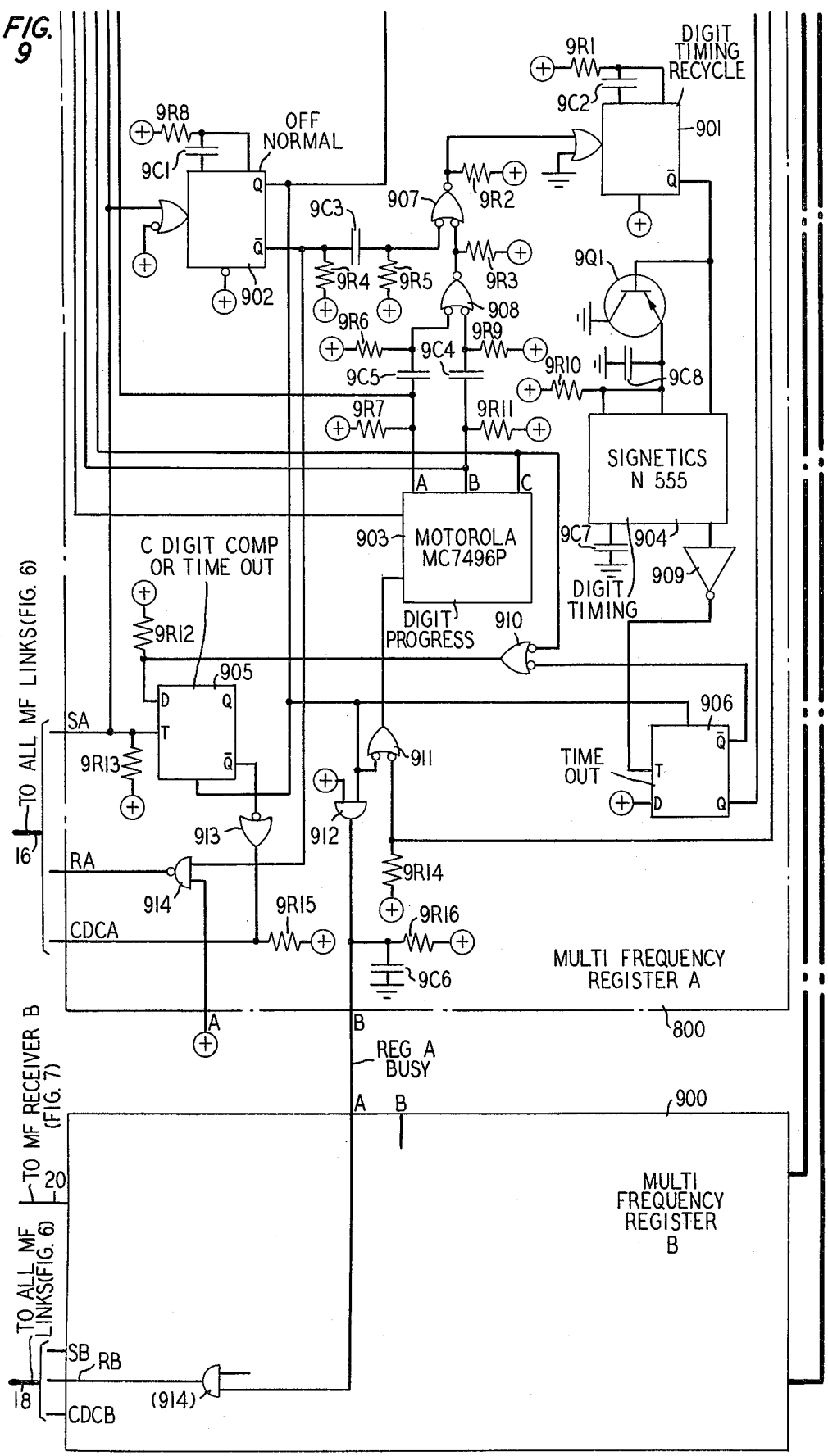

When one-shot 601 operates, the output of gate 609 goes high, which high is extended via lead SA, cable 16, to FIG. 9, thereby triggering one-shot 902. The Q output of one-shot 902 provides a high to gate 912 the output of which gate then goes high, which high is extended to the second multifrequency register 900 thereby preparing that register for activation on subsequent calls. At the same time, the $\overline{Q}$ output of one-shot 902 provides a low to gate 914 which in turn provides a high on lead RA, which high is provided over cable 16 to FIG. 6 to gate 610. The output of gate 610 goes low which low maintains the output of gate 619 low thereby keeping lead SA high.

Returning now to FIG. 9, when one shot 902 operates, the 10-second timer circuit is started, which timer circuit consists of transistor 9Q1 and digit timer 904, which digit timer can be any one of well-known number of digit timers such as Signetics No. N555. The purpose of the digit timer is to protect against the common register being seized by a line and then held with no dialing occurring, or with dialing occurring at spaced intervals in excess of 10 seconds. The digit timer is reset as each digit is received under control of one-shot 901 and gates 907 and 908. When the register is first seized the $\overline{Q}$ output of one-shot 902 provides a momentary low, via capacitor 9C3 to one input of gate 907 thereby triggering one-shot 901 which in turn causes timer 904 to begin a timed interval controlled by the charge rate of capacitor 9C8 and resistor 9R10. If time out occurs, i.e., the first digit is not received within 10 seconds, timer 904 operates providing a low to high transition on the toggle input to flip-flop 906 thereby providing a low on the $\overline{Q}$ output which low causes the output of gate 910 to be high and then on the next transition of lead SA the $\overline{Q}$ output of flip-flop 905 goes low providing a high on lead CDCA to release the circuit. Release occurs because the high on lead CDCA is provided via cable 16 to FIG. 6 gate 608 thereby providing a low on lead CDC and cable 10 to FIG. 2. This low is provided to gate 217 and at the next scan pulse the Q output of flip-flop 207 goes high which scans clear the flip-flop 211. At the same time, the low on the $\overline{Q}$ output of flip-flop 207 causes the Q output of flip-flop 206 to become set, via gate 215, from the high on lead RES of cable 11 thereby, operating relay 2NG. Relay 2NG operating serves to restrict the call via enabled transfer contacts 2NG-1 and 2NG-2. When relay 2NG operates the connection to the PBX is reversed and the PBX operates to restrict the call in the well-known manner.

Receipt of Digits

Continuing now in call denial circuit 200 FIG. 2, when the MF receiver is attached and the PBX is connected to the T and R leads, current flow is detected via detectors 204 and 205 turning on transistor 2Q1 thereby providing a high to low transition to the input of one-shot 302, FIG. 3, turning on that one-shot which in turn turns on dial pulse counter 306 which counter can be any one of the well-known pulse counters such as Motorola MC7490P. The circuit is now primed so that digits received over the T and R leads from the calling subscriber, whether the digits are multifrequency digits or rotary dial digits, will be received and decoded.

As discussed previously, the decoding for the rotary dial digits is accomplished by a circuit individual to call denial circuit 200 while the decoding for the multifrequency digits is accomplished by a circuit common to all of the call denial circuits, which common circuit has been assigned for the duration of this call to call denial circuit 200 in the manner discussed above. The operation of the individual dial pulse timers, resistors, counters and storage circuits, such as elements 305, 306, 307, 308, 309 and 310 are the same as detailed in aforementioned U.S. Pat. No. 3,821,485 and will not be detailed herein.

Assume for the moment that pulses are received over the T and R leads in the form of multifrequency dialed digits and further assume that the dialed number is the number 2. Accordingly, when the frequencies associated with number 2 appear on the T and R leads, these frequencies are extended over the path previously described to FIG. 7 and multifrequency receiver 700 (receiver A). These frequencies are translated by multifrequency receiver 700 into lows on certain combinations of the leads D1, D2, D4 and D8 of cable 19. For the digit "2" a low appears on lead D2. This low is provided to A, B and C digit storage circuits 801, 802 and 803, FIG. 8, and is stored in the active storage circuit A, B or C under control of digit progress circuit 903. Elements 801, 802 and 803 can be any one of the well-known elements arranged to provide the storage function, such as Motorola MC4035P. Digit progress element 903 can be advantageously arranged in any one of the well-known arrangements such as Motorola MC7496P.

Figure 8:
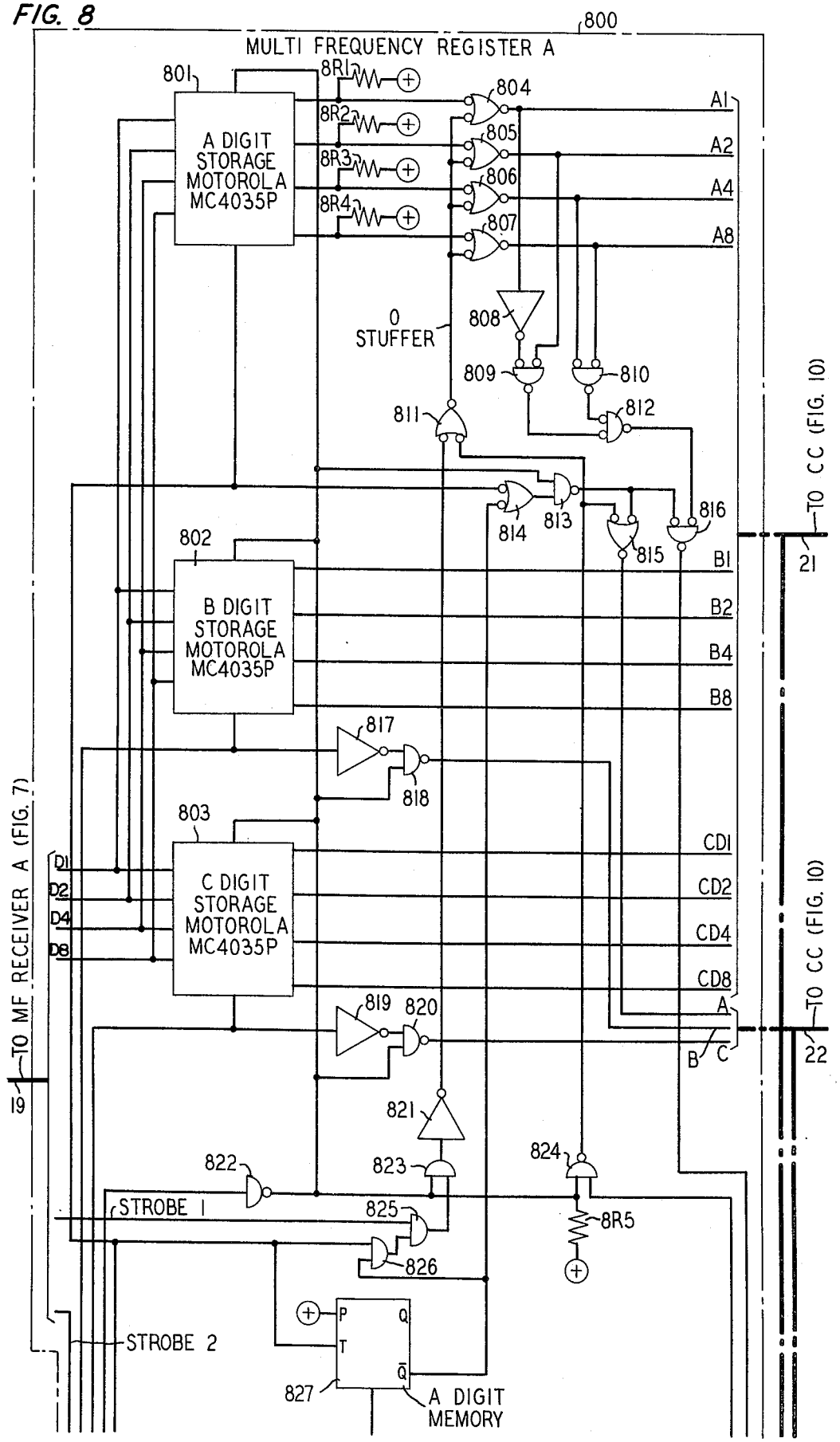

During the period in which the digits are being received from the calling subscriber, lead STROBE 1 from multifrequency receiver 700 provides a high signal over cable 19 to FIG. 8, this high causes the output of gate 825 to go high causing the output of gate 823 to go high, and the output of gates 821 and 811 to go low thereby forcing the outputs of gates 804, 805, 806 and 807 to be low. Thus, while the digit is being received leads A1, A2, A4 and A8 have lows therein. At the completion of the first digit, low appears on lead STROBE 2 from multifrequency receiver 700 which low is communicated to digit process controller 903, thereby causing output lead A thereof to go low. This low recycles the digit timer via capacitor 9C5 and gates 908 and 907. Also, the low on lead A causes the output of gate 826 to go low making the output of gate 823 low, the output of gate 821 high and the output of gate 811 high thereby removing the forced lows from leads A1, A2, A4 and A8. Thus the outputs on leads A1, A2, A4 and A8 are now free to asume the condition of the digit stored in A digit storage 801 which in our example is the digit "2". When the A digit is received, the low from the A digit output of digit progress element 903 causes the output of gate 814 to go high, which high is provided to one input of gate 813. During each scan pulse associated with the connected call denial circuit (scan pulse S0 in our example) the input to gate 822 goes low causing the output to go high. This high is provided to the other input to gate 813.

Accordingly, the output of gate 813 goes low which low is provided over lead A, cable 22, to common control 1000, FIG. 10.

The low on lead A is an indication that the A's digit has been received. At this time the digit decoding circuit and common control 1000 checks the A digit against the list of restricted numbers to determine whether the call should be restricted at this point. Since we have assumed digit 2 has been received, and since we can further assume that digit 2 is a valid first digit, no action is taken at this point. However, had the first digit been a digit such as zero, which is a restricted digit, common control 1000 would operate in a straightforward manner to provide a low signal over lead RES, cable 11, to FIG. 2 which signal operates flip-flop 206 in the manner previously described for the case of a time out. This operation turns on relay 2NG, FIG. 2. Relay 2NG operating reverses the T and R connection via enabled transfer contacts 2NG-1 and 2NG-2, which reversal serves as a signal to the PBX controller to restrict this call.

In the situation where the call is not restricted after the first digit, upon receipt of the second digit and the storage thereof in the B digit storge 802, FIG. 8, the B digit is checked by common control 1000 as is done with the subsequently received C digit. Since the scanner is providing pulses on the S0 lead at the rate of a pulse every 100 milliseconds, several pulses occur in the time slot associated with call denial circuit 200 between the A digit storage between the B digit storage and between the C digit storage. Since the A digit has been received, flip-flop 827 is set and the $\overline{Q}$ output is low which low maintains the output of gate 814 high. Continued pulses on the SA lead continue to cause the digit in the A digital storage element 801 to be communicated to common control 1000. Note that had some other call denial circuit, for example, the call denial circuit associated with scan pulse S10, become associated with the multifrequency register 800, the output of multifrequency register 800 would only be checked each time strobe pulse S10 occurs. Thus, while a common multifrequency detector is used, that detector is temporarily associated with the calling one of a call denial circuit and remains associated therewith for the duration of the receipt of the first three digits. Once the first three digits have been received, the common multifrequency register becomes disassociated from the call denial circuit and is free to become associated with any other call denial circuit. This disassociation is controlled by flip-flop 905 which operates under control of digit process controller 903 and receipt of the C digit or under control of time digit flip-flop 906 which flip-flop operates from digit timing circuit 904. In either event, at the completion of the C digit or upon time out, a signal is provided over lead CDCA, cable 16, to FIG. 6, which signal is extended via gate 608 and gate 622 and lead CDC, cable 10, to FIG. 2 to turn on flip-flops 207, and 206 thereby restricting the call as above discussed.

Protection Against Combined Rotary and MF Dialing

As discussed, during the time period when a first MF digit is being received, leads A1, A2, A4 and A8 are low. However, as discussed, lead A to common control 1000 remains high until the entire digit is received. Once the A digit is received, this low remains on lead A. The purpose of this is so that if a subscriber now attempts to rotary dial the next digit the pre-zero of the dial pulse register will be communicated to common control 1000 causing a restrict signal. This occurs, since, as shown in FIGS. 2 and 3, upon receipt of a dial pulse, counter 306 is in the zero (or no digits received state) and leads D1, D2, D4 and D8 have lows thereon which lows appear on leads A1, A2, A4 and A8. If the A lead to common control 1000 is high (first digit not received), the pre-zero would have no effect. However, had the first digit been an MF digit then the A lead would be grounded by the MF receiver and the pre-zero from the rotary dial pulse register would cause a restrict signal.

Also, it should be noted that had the first digit been rotary dial pulsed and the second or subsequent digits MF dialed then the pre-zero stuffer of the MF register would provide grounds on leads A1, A2, A4 and A8 of cable 21 thereby causing a restrict signal.

Recycle First Digit

The system is arranged to recycle on certain first digits, such as the digit "1". Flip-flop 827 in MF register 800 remembers that a first digit has been dialed so that the pre-zero control is inhibited, via gate 826. However, the A lead to common control 1000 is maintained low so that if a second digit is rotary dial pulsed the pre-zero from the A dial pulse register FIG. 3 causes low so that if a second digit is rotary dial pulsed the pre-zero from the A dial pulse register FIG. 3 causes a restrict signal. Recycle of the first digit is controlled by gates 808, 809, 810, 812, 816 and 911 to recycle digit progress element 903.

Key Telephone Operation

Figure 4:
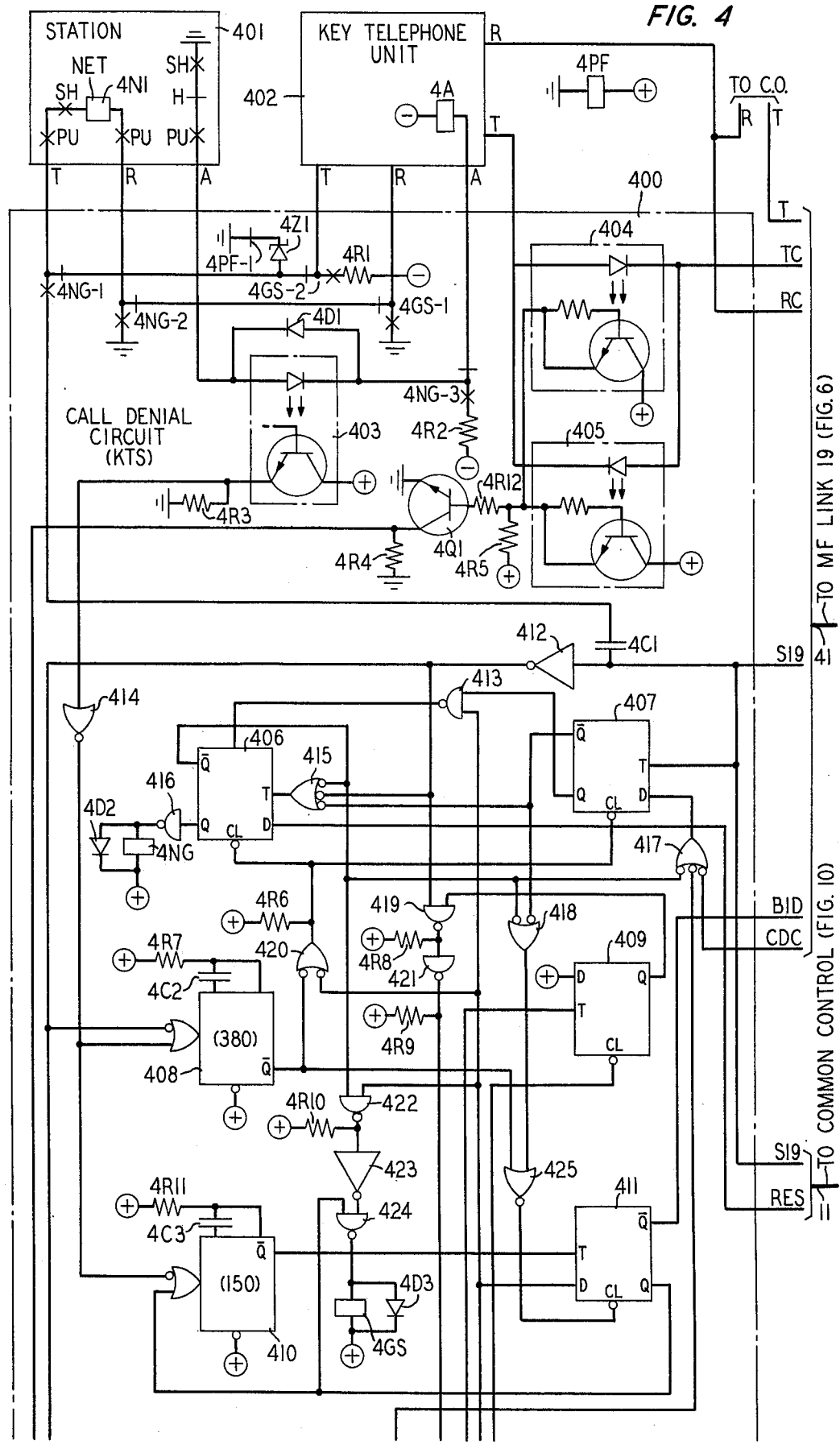
Figure 5:
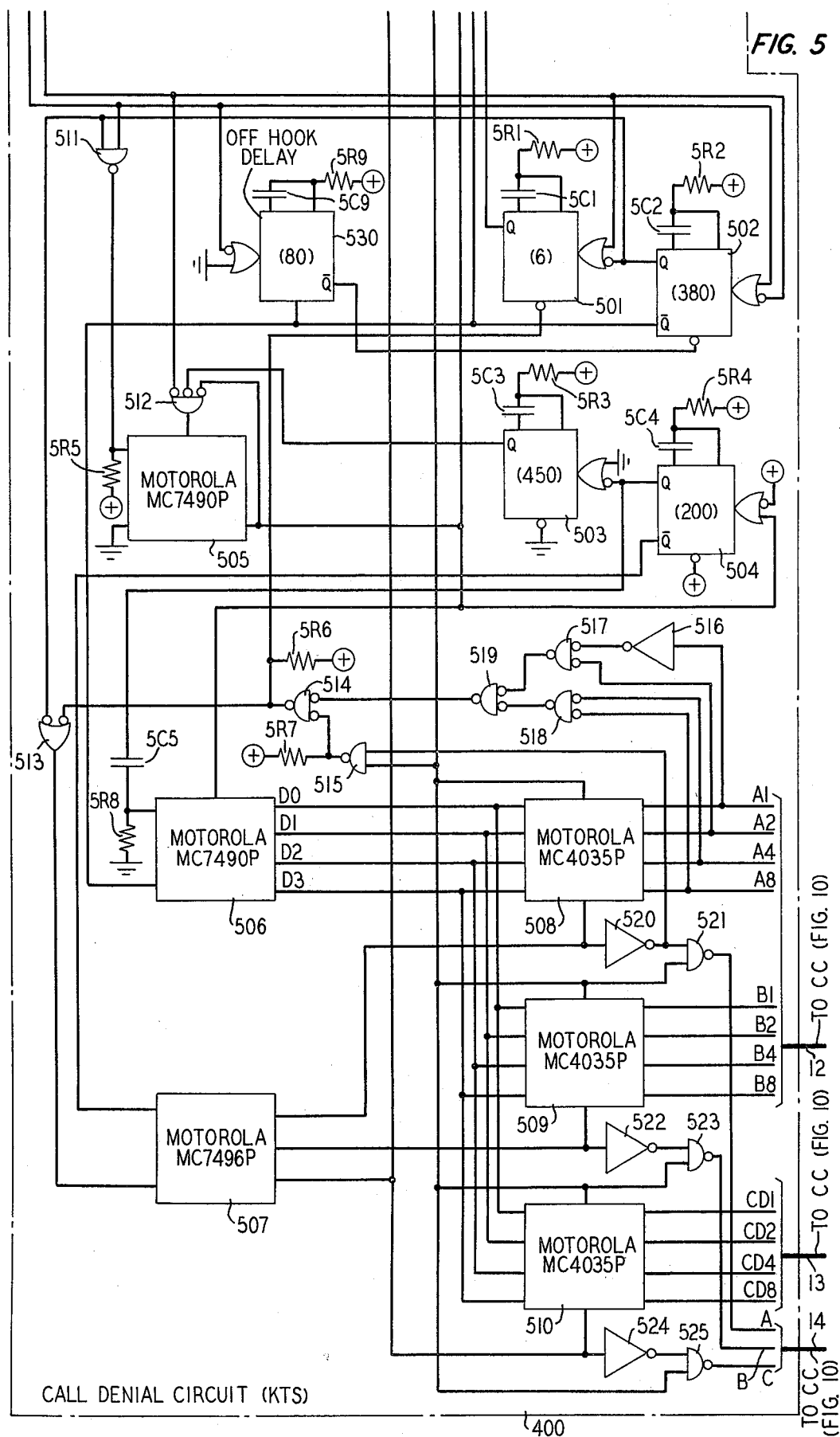

In FIG. 4 there is shown call denial circuit 400 which is arranged for key telephone operation. This circuit is arbitrarily assigned scan time slot 20 and thus is connected to the S19 lead from scanner 1005, FIG. 10. When a subscriber goes off-hook and operates the line pickup key current flows on lead A between station set 401 and KTU 402. This current is detected by detector 403, which detector is arranged similarly to detector 203. At this point call denial circuit 400 operates in the exact manner as does call denial circuit 200 to connect the key station to an available MF register during time slot S19. If call denial circuit 400 does not become connected to a MF register relay 6NA in link 19, FIG. 6, operates to prevent the central office (CO) from becoming connected to the active key station.

Upon the enabling of flip-flop 411, relay 4GS operates to provide ground start operation, via enabled transfer contacts 4GS-1 and 4GS-2 and KTU 402 to the CO. Current return from the CO is detected by detectors 404 and 405 which serve to release relay 4GS and operate one-shot 502. The operation of one-shot 502 is delayed 80 milliseconds by one-shot 530 to protect against noise and crosstalk caused by relay 4GS. Once relay 4GS releases the T and R leads are reconverted to loop operation.

In the event of a restricted call relay 4NG operates in the manner previously described. The operation of relay 4NG opens the T and R path, via transfer contacts 4NG-1 and 4NG-2. These same contacts serve to connect the station network 4N1, via capacitor 4C1 to the scan pulse on lead S19. Since this pulse repeats once each 100 milliseconds a distinctive tone is provided to the subscriber indicating the restricted nature of the call.

Power Failure

Relay 4PF releases during a power failure and in doing so provides ground, via released break contact 4PF-1 and zener diode 4Z1 and the enabled contacts in the station set, to the R lead, thereby completing the ground start operation. Accordingly, calls can be completed during a power failure, without regard to the operation of the call restricter circuit.

Conclusion

It should be understood that the above-described embodiment of our invention is merely illustrative of the teaching of our invention and various other embodiments may be devised by those skilled in the art without departing from the spirit and scope of our invention. Also it should be understood that any number of lines and any number of receivers can be used, depending only upon anticipated telephone usage.

What is claimed is:

1. A call denial arrangement for restricting completion of selected calls being placed over a plurality of telephone lines to a central office comprising rotary dial pulse recording means individual to each of said lines responsive to the receipt of signals thereover for recording rotary dial pulsed call directing digits, multifrequency recording means common to all of said lines operable for recording multifrequency signaled call directing digits, common means selectively connectable to individual ones of said lines for checking the recorded contents of said individual dial pulse recording means, and for generating a restrict signal when a denied call is determined, gating means associated with said individual lines being selectively enabled for coupling the associated one of said rotary dial pulsed recording means to said common checking means, and means for temporarily associating said multifrequency recording means with a calling one of said lines, said gating means including means for coupling an associated multifrequency recording means to said common checking means.

2. The invention set forth in claim 1 further comprising a call denial circuit individual to each said line and arranged for insertion in the connection between said line and said central office, each said call denial circuit including a said rotary dial pulse recording means, and a said gate means, and further including means for enabling said temporary associating means when said associated line is in a calling mode.

3. The invention set forth in claim 2 wherein each said call denial circuit includes means controlled by said gate means and responsive to said restrict signal for disconnecting said connection between said associated line and said central office.

4. The invention set forth in claim 3 wherein said call denial circuit further includes means concurrently operative with the enabling of said disconnecting means for providing a distinctive signal to said calling telephone line.

5. The invention set forth in claim 4 further comprising a continuously running scanner generating a scan pulse for each of said gate means to sequentially enable each of said gate means cyclically in a predetermined order whether or not there are contents in particular ones of said rotary dial pulsed or multifrequency recording means and at a rate such that the contents of each of said recording means are checked at least once after the recording of a digit therein.

6. The invention set forth in claim 5 wherein said distinctive signal is generated by said scan pulse.

7. A call denial circuit for use in a telephone system where calls are placed between telephone stations under control of dialed call directing digits and where a multifrequency recording means is operable for recording multifrequency dialed call directing digits and a common digit checking circuit is connectable to individual ones of said call denial circuits under control of a continuously running scanner which generates cyclically recurring scan pulses in a predetermined order, said call denial circuit adapted for connection to individual ones of said stations, said call denial circuit comprising means for determining the calling status of said individually associated station, means controlled jointly by said determining means and by one of said scan pulses for controlling connections between said associated station and said common multifrequency recording means, and means for establishing a connection between said common multifrequency recording means and said common digit checking circuit under control of said one scan pulse.

8. The invention set forth in claim 7 wherein said call denial circuit includes means controlled by said digit checking circuit and said one scan pulse for terminating a calling connection from said station.

9. The invention set forth in claim 8 wherein said call denial circuit further includes rotary dial pulse recording means for recording rotary dialed call directing digits, and means controlled jointly by said determining means and by said one scan pulse for establishing a connection between said rotary dial pulse recording means and said common digit checking circuit.

10. A call denial arrangement for restricting completion of selected calls being placed over a plurality of telephone lines to a central office comprising rotary dial pulse recording means individual to each of said lines responsive to the receipt of signals thereover for recording rotary dial pulsed call directing digits, multifrequency recording means common to all of said lines operable for recording multifrequency dialed call directing digits, means for temporarily associating said multifrequency recording means with a calling one of said lines, means selectively connectable to individual ones of said lines for checking the recorded contents of said individual dial pulse recording means and the recorded contents of a temporarily associated multifrequency recording means, gating means associated with said individual lines being selectively enabled for coupling the associated one of said rotary dial pulse recording means and said multifrequency recording means to said checking means, a continuously running scanner generating a scan pulse for each of said gate means to sequentially enable each of said gate means cyclically in a predetermined order whether or not there are contents in particular ones of said rotary dial pulse or multifrequency recording means and at a rate such that the contents of each of said recording means are checked at least once after the recording of a digit therein, means for enabling said restrict signal generating means when rotary dial pulsed digits are recorded in any dial pulse recording means concurrently with the recording of multifrequency signaled digits in said multifrequency recording means temporarily associated with the same line.

11. The invention set forth in claim 10 wherein said least-mentioned means includes means for generating a preset digit whenever digits are being received by either said rotary dial pulse recording means or by said multifrequency recording means, and means for providing said generated preset digit to said checking means only when dialed digits are received by both said rotary dial pulse recording means and by said multifrequency recording means.

12. In a telephone system where calling connections are established between telephone stations under control of call directing digits generated at calling ones of said stations, an arrangement for inhibiting the completion of calling connections established under control of certain preset combinations of said call directing digits, said arrangement comprising a call denial circuit individual to each of said calling stations, a plurality of multifrequency registers less in number than the number of call denial circuits, said multifrequency registers arranged common to all of said call denial circuits and operable for storing therein call directing digits, a digit matching circuit common to all of said multifrequency registers operable for generating an inhibit signal upon becoming connected to a multifrequency register having stored therein digits corresponding to said predetermined digits, means for detecting the calling status of any said station, means controlled by said detecting means for connecting a detected calling station to an idle one of said multifrequency registers, means for cyclically connecting said digit matching circuit to each of said multifrequency registers, means responsive to a connection of one of said multifrequency registers to said digit matching circuit for directing said inhibit signal generated by said digit matching circuit to the call denial circuit then connected to said one multifrequency register, and means in said call denial circuit operable upon receipt of a said inhibit signal for disconnecting said calling connection.

13. The invention set forth in claim 12 where each said call denial circuit further comprises rotary dial pulse register means, and means for cyclically connecting said rotary dial pulse register means of said call denial circuit to said digit matching circuit.

14. The invention set forth in claim 13 wherein said multifrequency cyclically connecting means and said rotary dial pulse register means cyclically connecting means includes scan pulse generating means.

15. The invention set forth in claim 14 wherein each said call denial circuit further includes means concurrently operative with said disconnecting means for providing a distinctive signal to said calling station.

16. The invention set forth in claim 15 wherein said distinctive signal is generated under control of said scan pulse generating means.

17. The invention set forth in claim 13 further comprising means for enabling said inhibit signal when digits are stored in said rotary dial pulse register means concurrently with the storage of digits in said multifrequency register when said multifrequency register and said rotary dial pulse register are both connected to the same station.

* * * * *

UNITED STATES PATENT AND TRADEMARK OFFICE
CERTIFICATE OF CORRECTION

PATENT NO. : 3,996,425
DATED : December 7, 1976
INVENTOR(S) : Arnold E. Low and Michael J. Sturtevant It is certified that error appears in the above-identified patent and that said Letters Patent are hereby corrected as shown below:

Change the Assignee from "Bell Telephone Laboratories, Incorporated, Murray Hill, N. J." to read --American Telephone and Telegraph Company, New York, N. Y.--.

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*